Oct. 27, 1936.                H. THOMA                2,059,155

HYDRAULIC TRANSMISSION

Filed March 26, 1936

INVENTOR
HANS THOMA

BY
A. A. Wicks
ATTORNEY

Patented Oct. 27, 1936

2,059,155

UNITED STATES PATENT OFFICE 2,059,155

HYDRAULIC TRANSMISSION

Hans Thoma, Karlsruhe-Baden, Germany

Application March 26, 1936, Serial No. 70,994
In Germany March 25, 1935

5 Claims. (Cl. 60—53)

This invention relates to hydraulic transmissions and particularly to means for circulating oil or other operating fluid through such transmissions.

An object of the invention is to provide means for this purpose which will permit the elimination of an oil circulating pump.

Another object is the provision in a hydraulic transmission which operates in a closed circuit of means for circulating oil or other fluid therethrough without the use of an external pump, the flow being effected by the normal difference in pressure existing in the device and caused by hydraulic friction in the conduits thereof.

Another object is the provision of a valve in connection with such a transmission which is controlled by pressure difference to cause the opening of a passage from the low pressure side to the atmosphere, thus permitting the emission of fluid from the system into a receptacle for cleaning, cooling, and subsequent return to the system.

An illustrative embodiment disclosing one form of the invention together with a modified valve is shown in the accompanying drawing in which.

Figure 1:
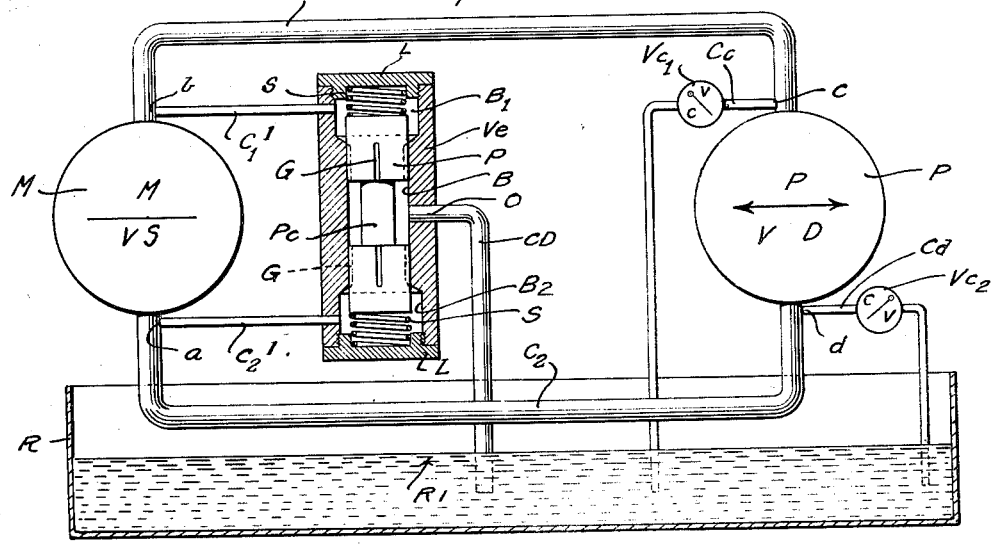
Fig. 1 is a schematic view of a hydraulic transmission the fluid delivery valve being shown partly in longitudinal cross section.

Referring to Fig. 1 of the drawing, the letter P designates any known or suitable pump which may be of the positive displacement type whereas M represents a fluid motor of any known or suitable type which may be of the positive displacement type. As examples of such pumps and/or motors, reference may be had to such devices shown in U. S. patent to Thoma No. 1,931,969, October 24, 1933, patent to Thoma No. 1,656,544, January 17, 1928, patent to Janney No. 1,020,285, March 12 1912, and patent to Janney No. 924,787, June 15, 1909. Both the pump and the motor may be of the variable displacement type and/or reversible flow type, as shown in said patents. However, either one may be of the variable volume type while the other has a fixed volume and in cases where the speed ratio of the transmission is to remain constant both pump and motor may be of the constant volume type.

In such transmissions of the open circuit type, i. e., where the motor discharge is conducted to a reservoir for cooling, cleaning, etc., from which the pump intake draws its supply, the oil or other working fluid is constantly changed and no fluid circulating means need be provided. In such systems, however, fluid flow through the pump and motor cannot be reversed for the purpose of reversing rotation unless the fluid reservoir is capable of sustaining the high pressures involved.

In the arrangement shown in Fig. 1, a closed conduit $C_1$ serves to conduct pressure oil from the pump to the motor whereas conduit $C_2$ conveys the low pressure fluid discharged from the motor to the intake side of the pump. Such a construction permits reversing of the motor by reversing the direction of rotation of the pump or by reversing the intake and delivery characteristics of the pump or of the motor. Furthermore, in such a construction the pump will serve as a brake for the motor. In such transmissions it has been thought necessary heretofore to provide a separate circulating pump to deliver fluid into the transmission to replace hot or unclean working fluid bled from the system. In the present construction advantage is taken of the difference in pressure developed in the conduit $C_1$ or $C_2$ for the purpose of introducing cooled and cleaned working fluid. It will be noted that conduits $Cc$ and $Cd$ are connected to the conduits $C_1$ and $C_2$ near the pump. The points of connection $c$ and $d$ are preferably as near to the pump as possible so as to take the fullest advantage of pressure drop in conduits $C_1$ and $C_2$. Conduit $Cc$ is provided with a check valve $Vc_1$, and leads into the fluid reservoir R to a point below the liquid level $R_1$. The conduit $Cd$ is provided with a check valve $Vc_2$ and leads into the fluid reservoir R to a point below the liquid level therein.

At points $a$ and $b$, as near as possible to the motor M, are connected conduits $C'_1$ and $C'_2$ which connect with valve $Ve$ of suitable construction. In the form shown this valve has a cylindrical bore B enlarged at its ends $B_1$ and $B_2$. Within the bore B is a piston valve P having enlarged end portions fitting within bore B but having a reduced central portion $Pc$. The end of the cylinder is preferably closed by caps L and the valve piston is preferably biased to its central position by means of springs S. As shown, the valve piston is supplied with a plurality of grooves G terminating, when the piston is in its central position, short of that point where the enlarged bores $B_1$ and $B_2$ begin, so that in this position no fluid will flow from either of the conduits $C'_1$ or $C'_2$ to the conduit CD.

The cylinder is provided near its center with an opening O which if desired may connect with a conduit CD for directing the discharged fluid to the reservoir R.

Assuming that pressure oil is delivered from the pump to the motor through conduit $C_1$ the pressure at $c$ is higher than atmospheric but fluid cannot be forced out through $Cc$ on account of check valve $Vc_1$. Furthermore, as the pressure at $b$ is much higher than at $a$, the valve piston will be driven downwardly, thus preventing any outflow through $C'_1$ but permitting flow through $C'_2$, grooves G, opening O, and conduits CD. Due to friction in conduits $C_2$ from the point $a$ to $d$, the pressure at $d$ is considerably lower than at $a$. The pressure within the system will therefore so adjust itself that the pressure at $a$ will be just sufficiently above atmospheric to drive a small definite quantity of fluid out of the system through CD to the reservoir, and the pressure at $d$ is sufficiently below atmospheric to cause fluid to pass from the reservoir through conduit $Cd$ into conduit $C_2$ at the point $d$.

Figure 2:
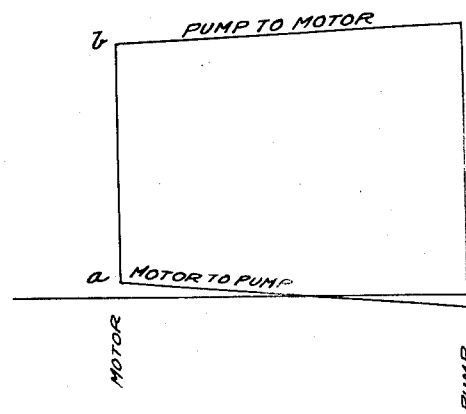
Fig. 2 is a diagram illustrating the pressure conditions.

Fig. 2 shows a pressure diagram illustrating the invention. The pump raises the pressure from the point marked $d$ on the chart to the point $c$. In passing through conduit $C_1$ from $c$ to $b$ the pressure drops slightly as shown by the sloping line $cb$. Within the motor the pressure drops from $b$ to $a$, slightly above atmospheric pressure, whereas in conduit $C_2$ there is a further pressure drop from $a$ to $d$. It will be seen therefore that the pressure at $a$ is slightly above atmospheric whereas at $d$ it is slightly below atmospheric, this difference being sufficient to drive a certain amount of oil out at the point $a$ and to permit oil to be drawn in at the point $d$.

If, due to a reduction in speed of the pump P or a reversal of its direction or if for any other reason the pressure at $a$ should become greater than the pressure at $b$ the valve piston will be moved upwardly, thus permitting bleeding of the system at the point $b$ (now the low pressure side). Conversely, the pressure at $c$ will now drop below atmospheric so that working fluid is drawn in at that point through conduit $Cc$. It will of course be understood that instead of using check valves $Vc_1$ and $Vc_2$ a second pressure controlled piston valve such as $Ve$ might be used.

Figure 3:
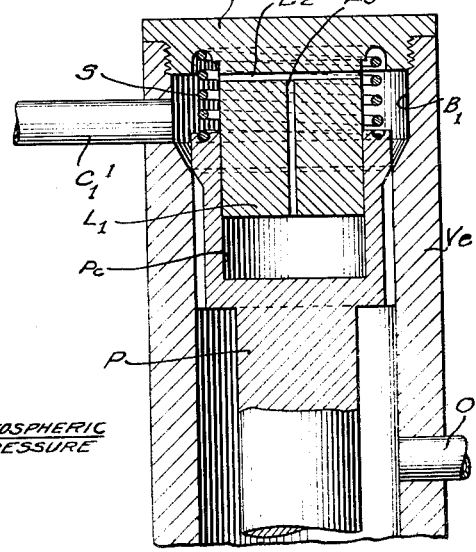
Fig. 3 illustrates a modified form of valve upon an enlarged scale.

When such transmissions are used in driving machinery having great and sudden load variations the piston valve will be moved rapidly from one extreme position to the other. The shock resulting therefrom will be reduced to some extent by the springs S. However, it may on occasion be desired to add a damping device of suitable construction. One such device is shown in Fig. 3 in which it will be noticed that the valve piston is formed with a cylindrical bore $Pc$ within its ends, within which fits an extension $L_1$ of the cap L. If the fit of the parts is properly adjusted the construction so far described will serve admirably as a damping device as the flow of oil between $L_1$ and $Pc$ is necessarily rather slow. If desired however, passages $L_2$ and $L_3$ may be provided for the purpose of permitting a definite but restricted in and out flow of the working fluid.

It will be noted furthermore that in transmissions where no pressure reversals will occur the valve $Ve$ as well as the check valves may be entirely dispensed with. For instance, as the conduit $C_1$ is constantly the high pressure side, a passage may be continuously open from $a$ to the reservoir for bleeding the transmission whereas a passage may be continuously open from $d$ to a point below the liquid level $R_1$. However, in order to achieve a full utilization of the invention it is desirable to provide means whereby its advantages can be secured in spite of pressure reversals.

It will be noted that the construction shown and described will serve admirably to accomplish the objects stated above. It is to be understood however that the construction disclosed above is intended merely as illustrative of the invention and not as limiting as various modifications therein may be made without departing from the invention as defined by proper interpretation of the claims which follow.

What is claimed is:

1. In a hydraulic transmission, a pump for receiving fluid and delivering it at increased pressure, a hydraulically actuated device for receiving fluid from said pump and discharging it at a lower pressure, a first conduit connecting the delivery side of the pump to the intake side of the device and a second conduit for connecting the delivery side of said device to the intake side of the pump, both of said conduits being so constructed as to offer appreciable resistance to flow of the fluid passing therethrough, as a result of which there will be a drop in pressure between the delivery side of the device and the intake side of said pump, a fluid reservoir, a third conduit leading from the delivery side of said device discharging into said reservoir and an intake passage leading from a point below the liquid level in said reservoir to the intake side of said pump.

2. In a hydraulic transmission, a pump for receiving fluid and delivering it at increased pressure, a hydraulically actuated device for receiving fluid from said pump and discharging it at a lower pressure, a first conduit connecting the normal delivery side of the pump to the normal intake side of the device and a second conduit for connecting the normal delivery side of said device to the normal intake side of the pump, both of said conduits being so constructed as to offer appreciable resistance to flow of the liquid passing therethrough, as a result of which there will be a drop in pressure between the delivery side of the device and the intake side of said pump, a fluid reservoir, a third conduit for discharging working fluid to the reservoir, a valve and cooperating connecting means for connecting said last mentioned conduit with the normal intake or the normal delivery side of said device, an intake passage leading from a point below the liquid level in said reservoir to the intake side of said pump, and valve means in said passage for preventing flow of liquid from said pump to said reservoir.

3. A device according to claim 2 in which the valve consists of a cylindrical casing having a reduced portion and enlarged closed ends, a piston having enlarged ends slidable in said reduced portion, and spring means for normally holding said piston in its central position, in which position the enlarged ends of said piston cut off communication between said connecting means and said third conduit.

4. In a hydraulic transmission, a pump for receiving fluid and delivering it at increased pressure, a hydraulically actuated device for receiving fluid from said pump and discharging it at a lower pressure, a first conduit connecting the delivery side of the pump to the intake side of the device and a second conduit for connecting the delivery side of said device to the intake side of the pump, both of said conduits being so constructed as to offer appreciable resistance to flow of the liquid passing therethrough, as a result of which there will be a drop in pressure between the delivery side of the device and the intake side of said pump, a fluid reservoir, a third conduit leading from the delivery side of said device discharging into said reservoir, an intake passage leading from a point below the liquid level in said reservoir to the intake side of said pump, and a valve in said intake passage constructed and arranged to prevent flow toward the reservoir.

5. In a hydraulic transmission, a pump for receiving fluid and delivering it at increased pressure, a hydraulically actuated device for receiving fluid from said pump and discharging it at a lower pressure, a first conduit connecting the pump to the device and a second conduit for connecting the device to the pump, both of said conduits being so constructed as to offer appreciable resistance to flow of the liquid passing therethrough, as a result of which there will be a drop in pressure between the delivery side of the device and the intake side of said pump, a fluid reservoir, a third conduit for discharging working fluid to the reservoir, connecting means and a cooperating valve responsive to the pressure on one side of the device for connecting the other side of said device to said third conduit, and an intake passage leading from a point below the liquid level in said reservoir to the intake side of said pump.

HANS THOMA.